US006832500B1

(12) United States Patent
Chen

(10) Patent No.: US 6,832,500 B1
(45) Date of Patent: Dec. 21, 2004

(54) ELECTRIC DOOR LOCK

(75) Inventor: Fang-Kun Chen, Chia-Yi (TW)

(73) Assignee: EZ Trend Technology Co., Ltd., Chia-Yi County (TW)

( * ) Notice: Subject to any disclaimer, the term of this patent is extended or adjusted under 35 U.S.C. 154(b) by 0 days.

(21) Appl. No.: 10/783,192

(22) Filed: Feb. 20, 2004

(51) Int. Cl.[7] .......................... B60R 25/02

(52) U.S. Cl. .......................... 70/223; 70/422; 292/336.3; 292/144

(58) Field of Search .......................... 292/142, 144, 292/336.3; 70/221–224, 275, 277, 279.1, 283, 283.1, 422, 278.1, 278.2, 278.3, 278.6, 278.7

(56) References Cited

U.S. PATENT DOCUMENTS

| | | | | | |
|---|---|---|---|---|---|
| 1,516,152 | A | * | 11/1924 | Dumont | 292/347 |
| 2,059,695 | A | * | 11/1936 | Jacobi | 70/369 |
| 3,587,080 | A | * | 6/1971 | Hawkins | 340/542 |
| 3,662,628 | A | * | 5/1972 | Schnepel | 81/474 |
| 4,438,962 | A | * | 3/1984 | Soloviff et al. | 292/144 |
| 4,517,865 | A | * | 5/1985 | Huang | 81/475 |
| 4,559,795 | A | * | 12/1985 | Zagoroff | 70/422 |
| 4,679,420 | A | * | 7/1987 | Yang | 70/422 |
| 4,773,240 | A | * | 9/1988 | Foshee | 70/222 |
| 4,920,824 | A | * | 5/1990 | Ward, II | 74/553 |
| 4,941,697 | A | * | 7/1990 | Fan | 292/336.3 |
| 5,388,434 | A | * | 2/1995 | Kalis | 70/58 |
| 5,619,874 | A | * | 4/1997 | Myers | 70/422 |
| 5,651,280 | A | * | 7/1997 | Park | 70/472 |
| 5,787,744 | A | * | 8/1998 | Berger et al. | 70/422 |
| 5,857,365 | A | * | 1/1999 | Armstrong | 70/279.1 |
| 6,012,310 | A | * | 1/2000 | Hsiao | 70/278.2 |
| 6,062,612 | A | * | 5/2000 | Lin | 292/144 |
| 6,406,072 | B1 | * | 6/2002 | Chen | 292/144 |
| 6,517,127 | B1 | * | 2/2003 | Lu et al. | 292/144 |
| 6,640,594 | B1 | * | 11/2003 | Yao | 70/277 |
| 6,725,693 | B2 | * | 4/2004 | Yu et al. | 70/107 |
| 6,739,164 | B2 | * | 5/2004 | Warmack | 70/257 |
| 2004/0031300 | A1 | * | 2/2004 | Wu | 70/223 |

* cited by examiner

*Primary Examiner*—Suzanne Dino Barrett
(74) *Attorney, Agent, or Firm*—McNees Wallace & Nurick LLP

(57) ABSTRACT

An electric door lock includes a lock housing, an operating member, a gear wheel, an actuating member, a driving motor, and a coupling unit. The operating member is mounted rotatably on the lock housing. The gear wheel is sleeved rotatably on the operating member. The actuating member is secured on the operating member so as to be co-rotatable therewith. The driving motor drives rotation of the gear wheel. The coupling unit interconnects the gear wheel and the actuating member such that the actuating member and the operating member rotate with the gear wheel when the driving motor drives rotation of the gear wheel, and disconnects the actuating member from the gear wheel when a rotating force is applied directly to rotate the operating member such that rotation of the actuating member with the operating member does not result in corresponding rotation of the gear wheel.

3 Claims, 3 Drawing Sheets

ELECTRIC DOOR LOCK

BACKGROUND OF THE INVENTION

1. Field of the Invention

The invention relates to an electric door lock, more particularly to an electric door lock that is operable in locking and unlocking modes both manually and electrically.

2. Description of the Related Art

A conventional electric door lock, which is operable in locking and unlocking modes both manually and electrically, includes a lock housing that confines an accommodating space. The lock housing is formed with a handle mounting hole therethrough. A manual operating member is mounted rotatably on the lock housing, and has an operating spindle that is disposed in the accommodating space and that extends through the handle mounting hole, and a manually operable rotary handle that is secured to one end of the operating spindle and that is disposed externally of the accommodating space. A first snap ring is secured to the operating spindle proximate to the manually operable rotary handle. A gear wheel is sleeved rotatably on the operating spindle, and has a first surface that abuts against the first snap ring, and a second surface that is opposite to the first surface of the gear wheel and that is formed with ratchet teeth. An actuating member is sleeved on the operating spindle so as to permit co-rotation of the actuating member with the operating spindle and axial movement of the actuating member relative to the operating spindle. The actuating member has a first surface that confronts the second surface of the gear wheel and that is formed with ratchet teeth, and a second surface that is opposite to the first surface of the actuating member. A second snap ring is secured to the operating spindle. A biasing spring is sleeved on the operating spindle, and has opposite ends abutting respectively against the second surface of the actuating member and the second snap ring. The biasing spring provides a biasing force for biasing the actuating member toward the gear wheel. An electric driving motor unit is mounted in the accommodating space and is operable so as to drive rotation of the gear wheel.

In operation, when the electric driving motor unit drives rotation of the gear wheel, the ratchet teeth on the second surface of the gear wheel engage the ratchet teeth on the first surface of the actuating member. Accordingly, the actuating member and the operating spindle rotate with the gear wheel. On the other hand, when a rotating force is applied directly to rotate the manually operable rotary handle of the manual operating member, since rotation of the gear wheel is resisted by the electric driving motor unit, the ratchet teeth on the first surface of the actuating member slide past the ratchet teeth on the second surface of the gear wheel. Accordingly, rotation of the actuating member with the operating spindle does not result in corresponding rotation of the gear wheel.

The actuating member is rotatable relative to the lock housing between first and second angular positions such that the electric door lock is operable in the locking and unlocking modes, respectively. In particular, the actuating member includes a switch actuator mounted on the second surface of the actuating member so as to permit co-rotation of the switch actuator with the actuating member. The switch actuator has a switch actuating portion that extends in radial outward, direction.

The electric driving motor unit includes an optoelectric switch that is activated and deactivated by the switch actuating portion when the resilient actuating member is rotated to the first and second angular positions, respectively. Hence, the optoelectric switch is actuated by the switch actuating portion when the electric door lock is in the locking mode, and is deactivated when the electric door lock is in the unlocking mode.

Although the aforementioned conventional electric door lock achieves its intended purpose, it requires numerous parts, which results in higher production costs and a larger size for the door lock.

SUMMARY OF THE INVENTION

Therefore, the object of the present invention is to provide an electric door lock that can overcome the aforesaid drawback of the prior art.

According to the present invention, an electric door lock for a door panel comprises a lock housing, a manual operating member, a gear wheel, a resilient actuating member, an electric driving motor, and a releasable coupling unit. The electric door lock is operable in locking and unlocking modes. The lock housing is adapted to be mounted on the door panel, is formed with a handle mounting hole, and confines an accommodating space. The manual operating member is mounted rotatably on the lock housing, and has an operating spindle that is disposed in the accommodating space and that extends through the handle mounting hole, and a manually operable rotary handle that is secured to one end of the operating spindle and that is disposed externally of the accommodating space. The gear wheel is sleeved rotatably on the operating spindle. The resilient actuating member has a securing portion secured to the operating spindle so as to permit co-rotation of the resilient actuating member with the operating spindle, an abutting portion disposed adjacent to the gear wheel, and a resilient connecting portion that extends from the securing portion to the abutting portion and that urges the abutting portion toward the gear wheel. The electric driving motor unit is mounted in the accommodating space and is operable so as to drive rotation of the gear wheel. The releasable coupling unit is provided on the gear wheel and the abutting portion of the resilient actuating member for coupling releasably the gear wheel and the resilient actuating member. The releasable coupling unit interconnects the gear wheel and the resilient actuating member such that the resilient actuating member and the operating spindle rotate with the gear wheel when the electric driving motor unit drives rotation of the gear wheel, and disconnects the resilient actuating member from the gear wheel when a rotating force is applied directly to rotate the manually operable rotary handle of the manual operating member such that rotation of the resilient actuating member with the operating spindle does not result in corresponding rotation of the gear wheel.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
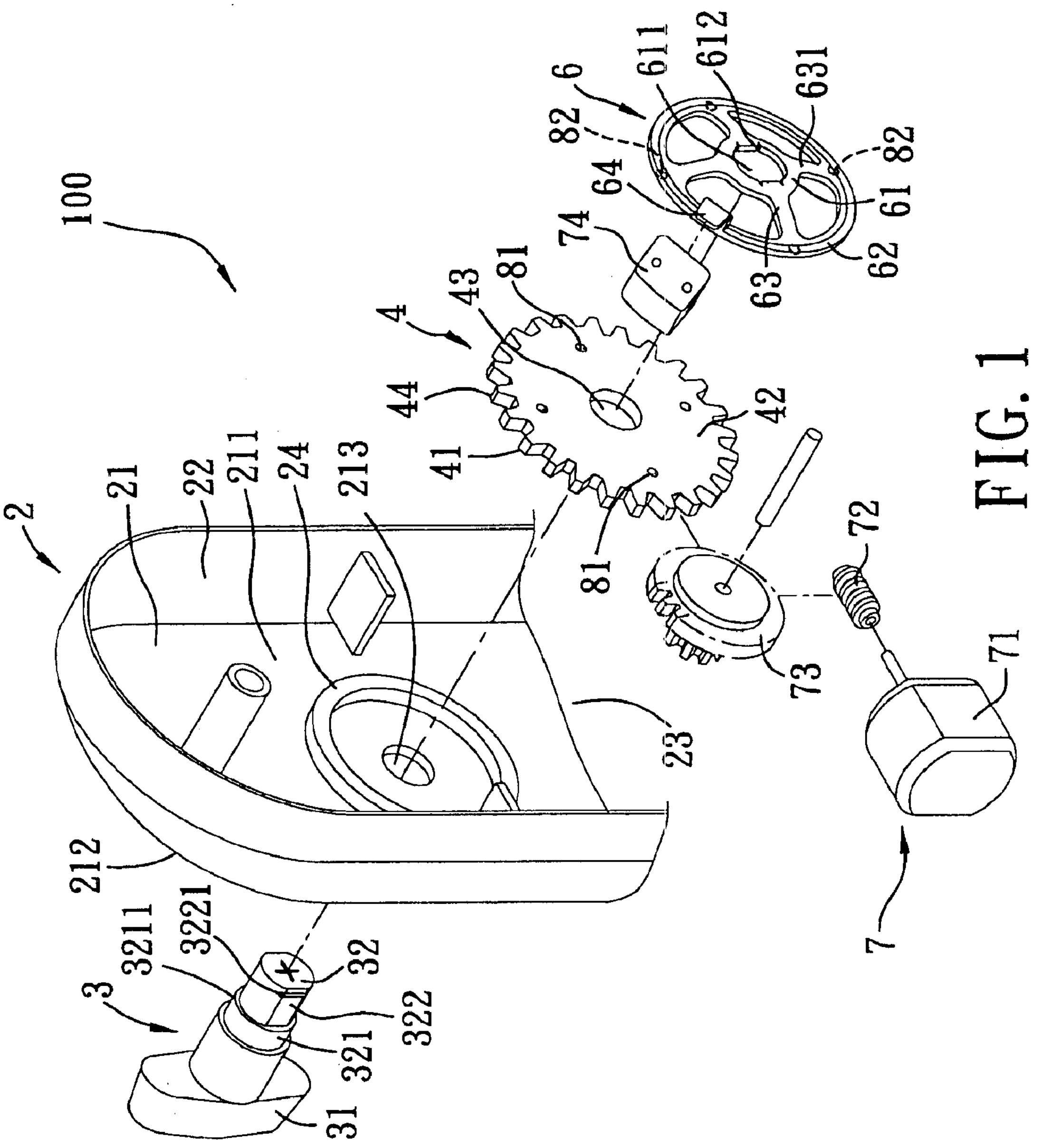
FIG. 1 is an exploded perspective view of the preferred embodiment of an electric door lock according to the present invention.
Figure 2:
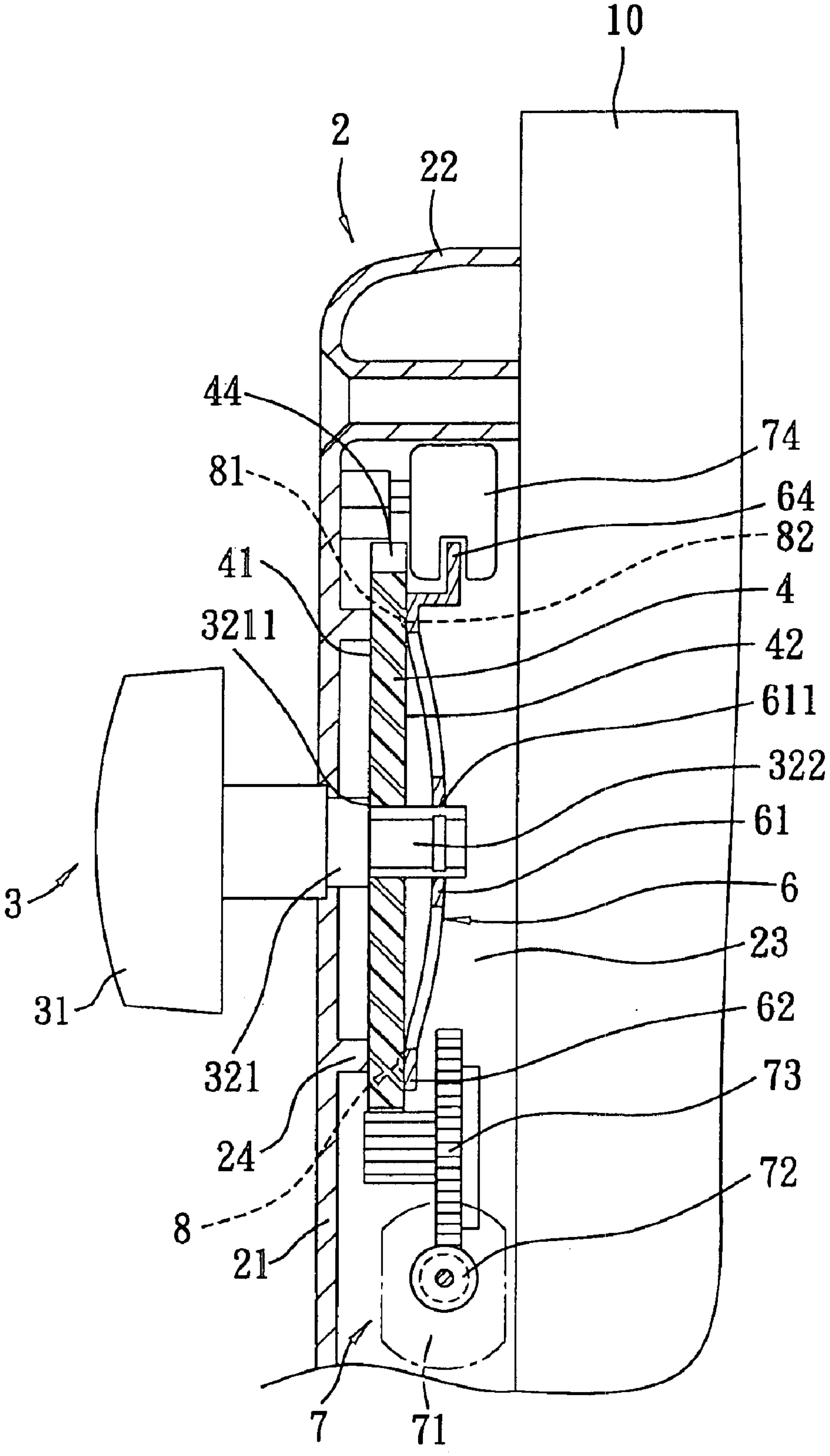
FIG. 2 is a schematic partly sectional view of the preferred embodiment to illustrate a gear wheel when connected to a resilient actuating member.
Figure 3:
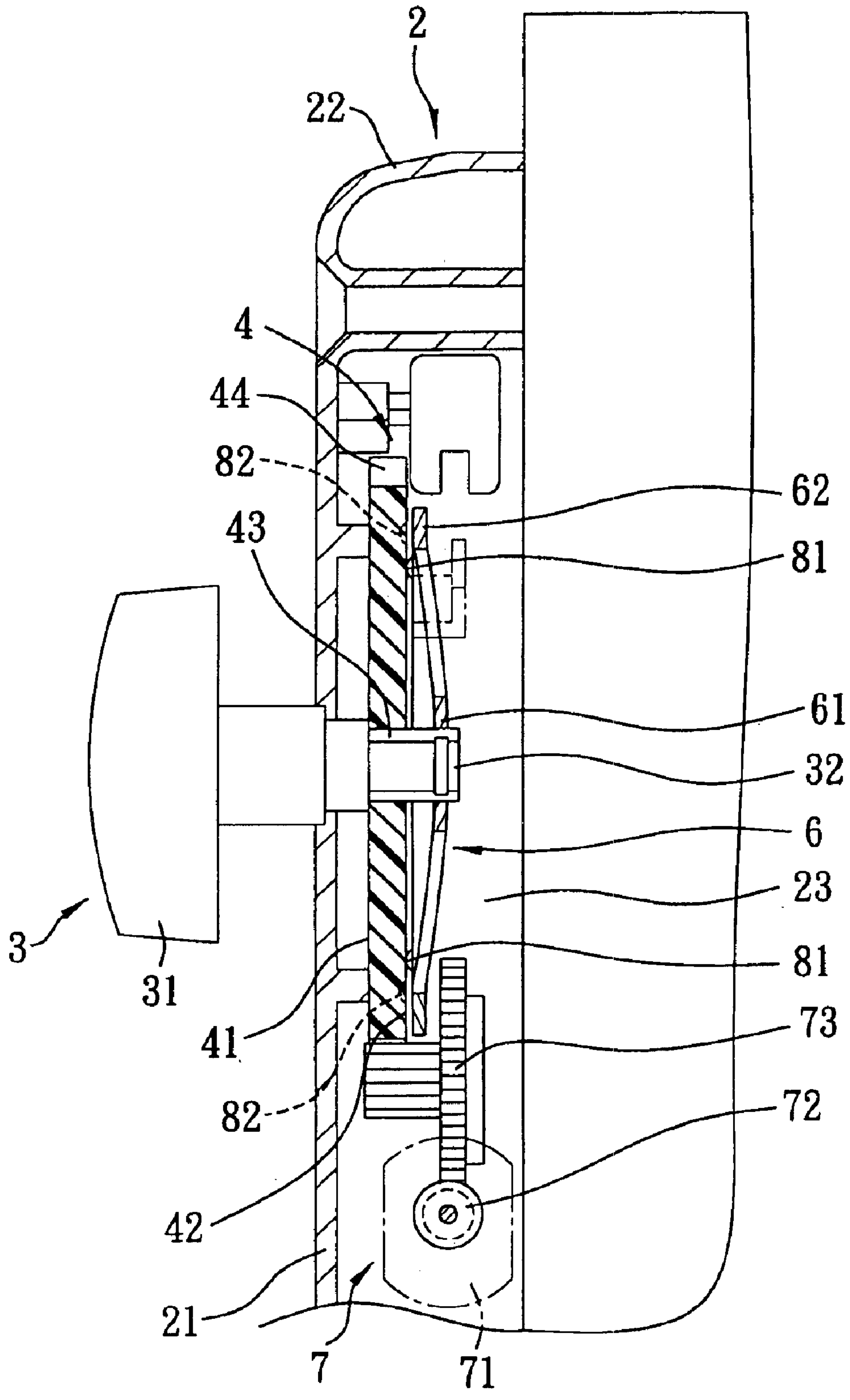
FIG. 3 is a schematic partly sectional view of the preferred embodiment to illustrate the resilient actuating member when disconnected from the gear wheel.

Referring to FIGS. 1 to 3, the preferred embodiment of an electric door lock 100 for a door panel 10 according to the present invention is shown to include a lock housing 2, a manual operating member 3, a gear wheel 4, a resilient actuating member 6, an electric driving motor unit 7, and a releasable coupling unit.

The electric door lock 100 is operable in locking and unlocking modes both manually and electrically, in a manner that will be described hereinafter.

The lock housing 2 is adapted to be mounted on the door panel 10. In this embodiment, the lock housing 2 includes a base wall 21 that has inner and outer wall surfaces 211, 212, and a surrounding wall 22 that extends from a periphery of the base wall 21 and that surrounds the inner wall surface 211 of the base wall 21. The base wall 21 of the lock housing 2 is formed with a handle mounting hole 213 therethrough. The inner wall surface 211 of the base wall 21 is formed with an annular protrusion 24 that surrounds the handle mounting hole 213. The base and surrounding walls 21, 22 of the lock housing 2 cooperate so as to confine an accommodating space 23.

The manual operating member 3 is mounted rotatably on the lock housing 2. In particular, the manual operating member 3 has an operating spindle 32 that is disposed in the accommodating space 23 and that extends through the handle mounting hole 213, and a manually operable rotary handle 31 that is secured to one end of the operating spindle 32, that is disposed externally of the accommodating space 23, and that abuts against the outer wall surface 212 of the lock housing 2. More particularly, the operating spindle 32 of the manual operating member 3 includes a first spindle portion 321 that is connected to the manually operable rotary handle 31 and that extends rotatably through the handle mounting hole 213, and a second spindle portion 322 that extends from the first spindle portion 321 away from the manually operable rotary handle 31. The first spindle portion 321 has a circular cross-section, and is formed with a radial abutment shoulder 3211 proximate to the second spindle portion 322. It is noted that the second spindle portion 322 has a four-sided non-circular cross-section such that the second spindle portion 322 has opposite flat sides, and opposite arching sides.

The gear wheel 4 has a first gear surface 41, a second gear surface 42 opposite to the first gear surface 41, and a peripheral gear surface 44 that extends from the first gear surface 41 to the second gear surface 42. The gear wheel is formed with a through hole 43 that extends through the first and second gear surfaces 41, 42. The peripheral gear surface 44 is formed with gear teeth. The gear wheel 4 is sleeved rotatably on the second spindle portion 322 of the operating spindle 32 such that the first gear surface 41 abuts against the radial abutment shoulder 3211 of the first spindle portion 31 of the operating spindle 32 of the manual operating member 3 and the annular protrusion 24 on the inner wall surface 211 of the base wall 21.

The resilient actuating member 6 has a securing portion 61, an abutting portion 62, and a resilient connecting portion 63 that extends from the securing portion 61 to the abutting portion 62. The securing portion 61 of the resilient actuating member 6 is secured to the second spindle portion 322 of the operating spindle 32 so as to permit co-rotation of the resilient actuating member 6 with the operating spindle 32. In particular, the securing portion 61 of the resilient actuating member 6 is formed with a through hole 611 that corresponds to the cross-section of the second spindle portion 322 of the operating spindle 32 of the manual operating member 3. Each of the opposite flat sides of the second spindle portion 322 of the operating spindle 32 is formed with a groove 3221. The through hole 611 in the securing portion 61 of the resilient actuating member 6 is defined by a periphery 612 that is cut at four corners. The securing portion 61 of the resilient actuating member 6 is sleeved fittingly on the second spindle portion 322 such that the opposite sides of the periphery 612 of the securing portion 61 are snugly received within the grooves 3221. The abutting portion 62 of the resilient actuating member 6 is annular, surrounds the securing portion 61, and is disposed adjacent to the second gear surface 42 of the gear wheel 4. The resilient connecting portion 63 of the resilient actuating member 6 includes a plurality of angularly spaced apart ribs 631, which extend in radial outward directions from the securing portion 61. The resilient connecting portion 63 urges the abutting portion 62 toward the gear wheel 4. As a consequence, the abutting portion 62 of the resilient actuating member 6 biases the gear wheel 4 to abut against the radial abutment shoulder 3211 and the annular protrusion 24.

The electric driving motor unit 7 is mounted in the accommodating space 23 and is operable so as to drive rotation of the gear wheel 4 in a known manner. In particular, the electric driving motor unit 7 includes a motor 71 with a transmission shaft, a worm wheel 72 secured to the transmission shaft of the motor 71, and a transmission gear 73 coupled to the worm wheel 72 and the gear teeth on the peripheral gear surface 44 of the gear wheel 4. The worm wheel 72 is rotatable about an axis of rotation of the transmission shaft during operation of the motor 71. The transmission gear 73 transmits rotation of the worm wheel 72 to the gear wheel 4.

The releasable coupling unit is provided on the gear wheel 4 and the abutting portion 62 of the resilient actuating member 6 for coupling releasably the gear wheel 4 and the resilient actuating member 6. The releasable coupling unit interconnects the gear wheel 4 and the resilient actuating member 6 such that the resilient actuating member 6 and the operating spindle 32 rotate with the gear wheel 4 when the electric driving motor unit 7 drives rotation of the gear wheel 4 (see FIG. 2), and disconnects the resilient actuating member 6 from the gear wheel 4 when a rotating force is applied directly to rotate the manually operable rotary handle 31 of the manual operating member 3 such that rotation of the resilient actuating member 6 with the operating spindle 32 does not result in corresponding rotation of the gear wheel 4 (see FIG. 3). In this embodiment, the releasable coupling unit includes a plurality of angularly spaced apart locking recesses 81 formed in the second gear surface 42 of the gear wheel 4, and a plurality of angularly spaced apart locking protrusions 82 formed in the abutting portion 62 of the resilient actuating member 6.

In operation, when the electric driving motor unit 7 is operated, such as with the use of a remote controller (not shown), so as to drive rotation of the gear wheel 4, the locking protrusions 82 engage aligned ones of the locking recesses 81, as shown in FIG. 2, thereby permitting rotation of the resilient actuating member 6 with the gear wheel 4. On the other hand, when the rotating force is applied directly to rotate the manually operable rotary handle 31 of the manual operating member 3, at this time, since rotation of the gear wheel 4 is resisted due to the coupling with the inactive electric driving motor unit 7, each of the locking protrusions 82 slides out of a respective one of the locking recesses 81, as shown in FIG. 3, thereby disconnecting the resilient actuating member 6 from the gear wheel 4.

The resilient actuating member 6 is rotatable relative to the lock housing 2 between first and second angular positions such that the electric door lock 100 is operable in the locking and unlocking modes, respectively. In this embodiment, the resilient actuating member 6 further has a switch actuating portion 64 that is formed on and that extends in radial outward direction from the abutting portion 62 of the resilient actuating member 6. The electric driving motor unit 7 further includes a switch device 74 that is activated and deactivated by the switch actuating portion 64 when the resilient actuating member 6 is rotated to the first and second angular positions, respectively.

It is noted that the switch device 74 of the electric driving motor unit 7 is actuated by the switch actuating portion 64 of the resilient actuating member 6, as shown in FIG. 2, when the electric door lock 100 is in the locking mode, and is deactivated by the switch actuating portion 64, as shown in FIG. 3, when the electric door lock 100 is in the unlocking mode. The switch device 74 in this embodiment is an optoelectric switch. In an alternative embodiment, the switch device may be of a micro switch or of any other type.

It has thus been shown that the electric door lock 100 of the present invention is manually and electrically operable in locking and unlocking modes, and includes relatively few parts to facilitate assembly, to reduce the size of the electric door lock 100, and to result in lower production costs.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An electric door lock for a door panel, said electric door lock being operable in locking and unlocking modes, and comprising:

a lock housing adapted to be mounted on the door panel, formed with a handle mounting hole, and confining an accommodating space;

a manual operating member mounted rotatably on said lock housing, said manual operating member having an operating spindle that is disposed in said accommodating space and that extends through said handle mounting hole, and a manually operable rotary handle that is secured to one end of said operating spindle and that is disposed externally of said accommodating space;

a gear wheel sleeved rotatably on said operating spindle;

a resilient actuating member having a securing portion secured to said operating spindle so as to permit co-rotation of said resilient actuating member with said operating spindle, an abutting portion disposed adjacent to said gear wheel, and a resilient connecting portion extending from said securing portion to said abutting portion and urging said abutting portion toward said gear wheel;

an electric driving motor unit mounted in said accommodating space and operable so as to drive rotation of said gear wheel;

a releasable coupling unit provided on said gear wheel and said abutting portion of said resilient actuating member for coupling releasably said gear wheel and said resilient actuating member;

said releasable coupling unit interconnecting said gear wheel and said resilient actuating member such that said resilient actuating member and said operating spindle rotate with said gear wheel when said electric driving motor unit drives rotation of said gear wheel;

said releasable coupling unit disconnecting said resilient actuating member from said gear wheel when a rotating force is applied directly to rotate said manually operable rotary handle of said manual operating member such that rotation of said resilient actuating member with said operating spindle does not result in corresponding rotation of said gear wheel;

said releasable coupling unit includes a locking recess formed in one of said gear wheel and said abutting portion of said resilient actuating member, and a locking protrusion formed in the other one of said gear wheel and said abutting portion of said resilient actuating member;

said locking protrusion engaging said locking recess when said electric driving motor unit drives rotation of said gear wheel, thereby permitting rotation of said resilient actuating member with said gear wheel;

said locking protrusion sliding out of said locking recess when the rotating force is applied to rotate said manual operating member, thereby disconnecting said resilient actuating member from said gear wheel;

said operating spindle of said manual operating member includes a first spindle portion connected to said manually operable rotary handle and extending rotatably through said handle mounting hole, and a second spindle portion extending from said first spindle portion away from said manually operable rotary handle;

said first spindle portion being formed with a radial abutment shoulder proximate to said second spindle portion;

said gear wheel being sleeved rotatable on said second spindle portion;

said securing portion of said resilient actuating member being sleeved fittingly on said second spindle portion;

said abutting portion of said resilient actuating member biasing said gear wheel toward said radial abutment shoulder; and wherein said abutting portion of said resilient actuating member is annular and surrounds said securing portion, said resilient connecting portion of said resilient actuating member including a plurality of angularly spaced apart ribs that extend in radial outward directions from said securing portion.

2. The electric door lock as claimed in claim 1, wherein said electric driving motor unit includes a motor with a transmission shaft, a worm wheel that is secured to said transmission shaft of said motor, and a transmission gear that is coupled to said worm wheel and said gear wheel.

3. The electric door lock as claimed in claim 2, wherein said resilient actuating member further has a switch actuating portion, said electric driving motor unit further including a switch device actuated by said switch actuating portion of said resilient actuating member when said electric door lock is in the locking mode.

* * * * *